United States Patent [19]

Fahlén

[11] Patent Number: 4,625,254
[45] Date of Patent: Nov. 25, 1986

[54] VOLTAGE TRIGGER MEANS FOR A SERIES CAPACITOR PROTECTOR

[75] Inventor: Nils Fahlén, Västerås, Sweden

[73] Assignee: Asea Aktiebolag, Västerås, Sweden

[21] Appl. No.: 620,955

[22] Filed: Jun. 15, 1984

[30] Foreign Application Priority Data

Jun. 17, 1983 [SE] Sweden .............................. 8303481

[51] Int. Cl.⁴ .............................................. H02H 7/16
[52] U.S. Cl. ...................................................... 361/16
[58] Field of Search .............................. 361/15, 16, 17

[56] References Cited

U.S. PATENT DOCUMENTS

| 2,862,152 | 11/1958 | Ryden | 361/16 |
| 2,878,428 | 3/1959 | Bockman et al. | 361/16 |
| 4,174,529 | 11/1979 | Hamann | 361/16 |
| 4,295,174 | 10/1981 | Peterson et al. | 361/16 |
| 4,347,539 | 8/1982 | Peterson et al. | 361/17 |
| 4,432,029 | 2/1984 | Lundqvist | 361/16 |

Primary Examiner—A. D. Pellinen
Assistant Examiner—A. Jonathan Wysocki
Attorney, Agent, or Firm—Watson Cole Grindle & Watson

[57] ABSTRACT

A linear resistor is serially connected to a voltage-dependent metal oxide varistor and the series-connected resistor elements are connected in parallel with the series capacitor of a high voltage network to provide an overvoltage protection circuit for the series capacitor. A spark gap is also connected in parallel with the series-connected resistor elements in case of overload thereof. The voltage across the linear resistor triggers device for firing the spark gap when the voltage across the linear resistor exceeds a predetermined voltage. The resistance of the linear resistor and that of the varistor is dimensioned such that the predetermined voltage constitutes the smaller part of the voltage across the capacitor.

10 Claims, 6 Drawing Figures

VOLTAGE TRIGGER MEANS FOR A SERIES CAPACITOR PROTECTOR

BACKGROUND OF THE INVENTION

1. Field of the Invention

The present invention relates to a protective means for a series capacitor in a high-voltage network, said means comprising a voltage-dependent resistor built up of metal oxide varistors and arranged in parallel with the series capacitor, a spark gap arranged in parallel with the voltage-dependent resistor for shunting the resistor in case of overload thereof, and a trigger device for firing the spark gap.

2. Prior art

For protection of a series capacitor it is known to arrange, in parallel with the capacitor, a voltage-dependent resistor means built up of metal oxide varistors in the form of ceramic blocks. If such a resistor means is to be dimensioned for the entire short-circuit power of the network, it will become large and expensive. Because of the high energy absorption capacity required, the means, in addition, has to be provided with several parallel resistor branches, which requires special measures in order to achieve a controlled current division between different parallel branches (see, e.g., U.S. Pat. No. 4,347,539). Another serious drawback in a protective means having only parallel resistors is that if, for example due to an overload, a fault with a resulting short-circuit occurs in one or more of the resistor blocks, an internal overpressure may be generated in the porcelain housing of the resistor, whereby the housing may crack resulting in a total breakdown.

It is also known, in protective means of the above-mentioned kind, to arrange a protective spark gap, provided with forced triggering, in parallel with the voltage-dependent resistor. The cost of the resistor can therefore be kept low by dimensioning the resistor to absorb only a limited amount of energy. When the absorbed energy exceeds the level predetermined by the dimensioning, the parallel spark gap is activated and is then extinguished by external current interruption or shunting. Different trigger devices for a protective spark gap of said kind are known. In these devices, the energy for triggering the spark gap is taken from a current transformer arranged in series with the resistor (see, e.g., U.S. Pat. Nos. 4,174,529 and 4,432,029). Since the triggering may require relatively high power, this transformer will have a high rating and therefore becomes expensive. Further, these devices are provided with switching devices (e.g. in the form of transsistor switches) which are complicated and expensive.

SUMMARY OF THE INVENTION

The object of the present invention is to provide a protective means of the above-mentioned kind which does not suffer from the drawbacks mentioned. This is achieved according to the invention with a protective means comprising a linear resistor connected in series with said voltage-dependent resistor, means for providing to said trigger device the voltage generated across said linear resistor for activating said trigger device when said voltage exceeds a predetermined voltage, said linear resistor being so adapted to said voltage-dependent resistor that said predetermined voltage is less than half the total voltage across the capacitor.

The protective circuit according to the invention provides a higher reliability of operation and has, among other things, the additional advantage of being a so-called passive circuit which does not require auxiliary voltage supply. Contrary to the said known circuits, in which the triggering is initiated by the current through the resistor, the triggering is performed by a voltage which grows linearly and which upon firing amounts to only a small part of the entire voltage across the capacitor. This results in a good triggering accuracy, whereby closer margins when dimensioning the resistor can be permitted. The cost of the protective circuit can thus be reduced, above all because the size of the metal oxide resistor can be reduced most considerably. In addition, inexpensive spark gaps and associated components can be used.

BRIEF DESCRIPTION OF THE DRAWING

The invention will be explained in greater detail by means of a number of embodiments with reference to the accompanying drawings, wherein.

DESCRIPTION OF PREFERRED EMBODIMENTS

Figure 1:
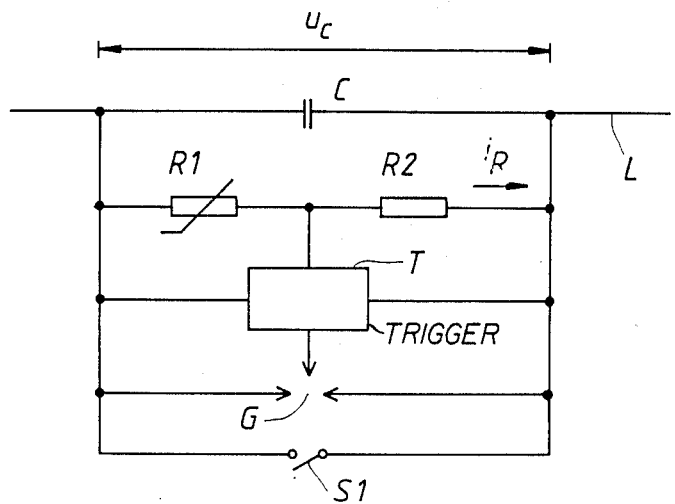
FIG. 1 shows the principle of a protective means according to the invention.

FIG. 1 shows a protective circuit for a series capacitor bank C connected into a high-voltage line L. The capacitor bank is only schematically shown and in reality comprises a large number of series and/or parallel-connected capacitor units. A resistor means, consisting of a voltage-dependent resistor R1 in series with a linear resistor R2, is connected in parallel across the capacitor bank to protect the latter from harmful overvoltages which may occur, for example in case of a short-circuit on the high-voltage line. The resistor R1 is built up of a large number of series and/or parallel-connected ZnO varistor blocks. A spark gap G is connected in parallel across the resistor means R1, R2 to protect the latter from overload. A damping circuit may possibly be arranged in series with the spark gap, said damping circuit consisting, for example, of a parallel connection of a reactor and a resistor for limiting the amplitude of the capacitor current when the spark gap is ignited. In parallel with the spark gap G, there is a by-pass circuit breaker S1 which will close a certain time after the gap has been ignited, partly for protecting the gap from overload, partly for enabling a fast reinsertion of the line after a short-circuit interruption.

For triggering the spark gap G the voltage across the linear resistor R2 is utilized, which voltage is supplied to a trigger device T, which in turn fires the spark gap. The trigger device may be designed in several different ways, as will be clear from FIGS. 3-6.

Figure 2:
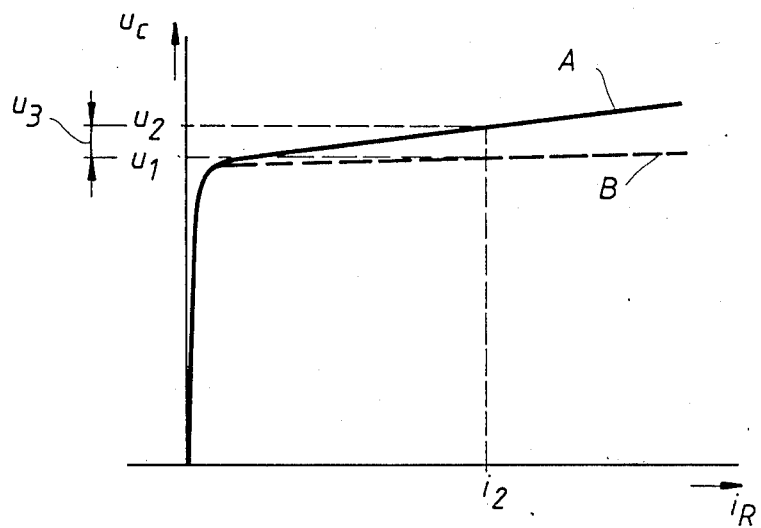
FIG. 2 shows schematically the current-voltage characteristic of a resistor branch included in the protective means according to FIG. 1, FIGS. 3, 4 and 5 show three different protective circuits, each having two series-connected main spark gaps and a trigger device consisting of an auxiliary spark gap and a resistor.

In FIG. 2 curve A shows the total voltage across the seriesconnected resistors R1, R2 (=the capacitor voltage $u_c$) as a function of the current $i_R$ through the resistors, and curve B shows separately the voltage across the zinc oxide resistor R1 as a function of $i_R$.

Upon a short-circuit on the line L, the current through the capacitor bank, and thus also the capacitor voltage $u_C$, increases. When the capacitor voltage (the instantaneous value) has risen to the value $u_1$, the current is commutated over to the resistor branch R1, R2. Upon a further current increase, only a slight increase of the partial voltage across the zinc oxide resistor R1 takes place (because of the considerable voltage dependence of this resistor), whereas the partial voltage across the resistor R2 grows linearly with the current. If the peak value of the short-circuit current amounts to or exceeds the value $i_2$, which corresponds to a voltage $u_2$ across the capacitor bank, a voltage $u_3$ is obtained across the linear resistor R2 which is sufficiently high to activate the trigger device T for firing the spark gap G. Upon firing the voltage $u_3$ amounts to only about one-tenth of the entire voltage $u_2$. The means according to FIGS. 1 and 2 may, for example, refer to a plant where $u_2 = 200$ kV, $i_2 = 10$ kA and $R_2 = 2$ ohms.

Figure 3:
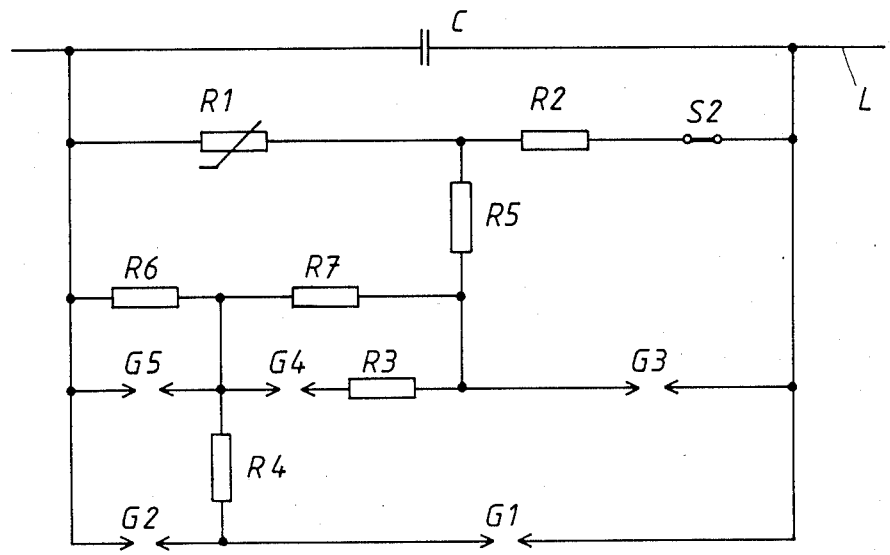

In the embodiment according to FIG. 3, the spark G consists of two series-connected main spark gaps G1 and G2. A trigger circuit is arranged in parallel with the spark gaps G1, G2. The trigger circuit consists of three series-connected auxiliary spark gaps G3, G4 and G5 of precision design and a number of resistors R3–R7, which preferably are voltage-dependent. The firing voltage for G3 may, for example, be 0.1 $u_2$, where $u_2$ is the highest voltage permitted to appear across the capacitor, whereas the firing voltage for the spark gaps G4 and G5 may be 0.45 $u_2$.

When, in case of a short-circuit on the line L, the voltage across the resistor R2 rises to the value 0.1 $u_2$, the spark gap G3 fires. At that time, the voltage across the auxiliary spark gaps G4 and G5, which have not yet fired, rises to a level which exceeds the firing voltage of said spark gaps, whereby also these spark gaps are fired. The whole voltage across the capacitor bank then lies across the resistor R3 and thus also across the partial spark gap G1, which is thereby fired. This, in turn, provides a doubling of the voltage across the second partial spark gap G2, whereby also this is fired.

A normally closed circuit breaker S2 may possibly be arranged in series with the zinc oxide resistor R1. This circuit breaker may suitably be controlled from the protective relays for the line L in such a way that it opens automatically if the spark gaps G1, G2 have fired and the short-circuit voltage is not interrupted within a certain time. This measure further increases the protection of the ZnO varistor R1 and results in increased reliability in operation. If a fault should nevertheless occur in one or more of the resistor units included in the resistor branch R1, R2, the circuit breaker S2 makes it possible to disconnect the resistor branch and continue operation on the line L for a shorter period until the fault has been cleared. Since there occur, in the resistor branch R1, R2, relatively long current-weak intervals during the passages of current through zero, the interruption of the resistor current will be relatively simple. The circuit breaker 52 may therefore be a relatively simple high-voltage circuit breaker.

Figure 4:
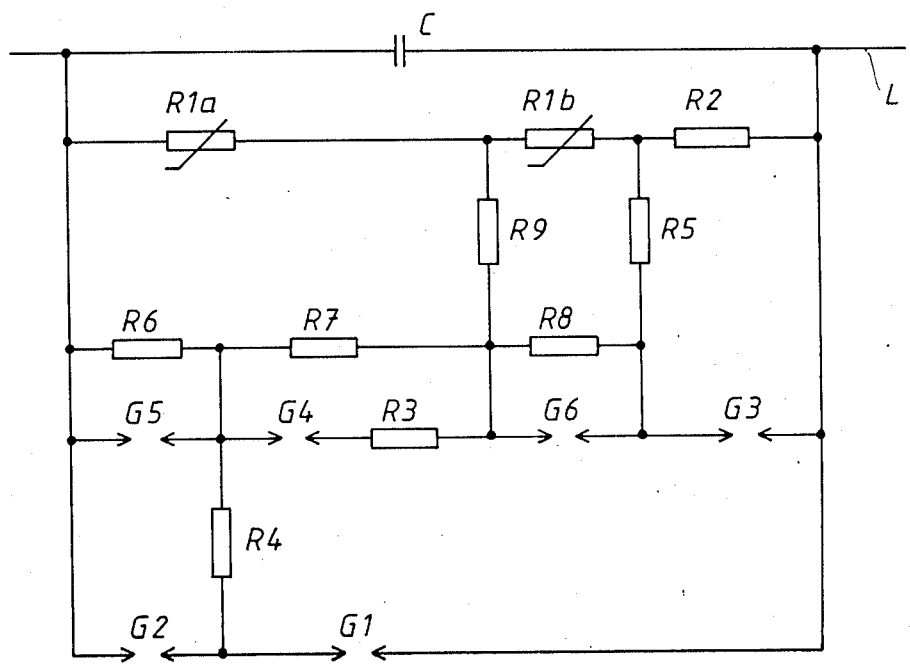

FIG. 4 shows an embodiment of the invention in which the trigger circuit, in addition to the components shown in FIG. 3, has an additional auxiliary spark gap G6 with a parallel resistor R8. Furthermore, the zinc oxide resistor R1 is here divided into two partial resistors R1a and R1b, and a crossconnection is arranged via a resistor R9 from a point between these partial resistors to a point in the auxiliary spark gap chain in such a way that the spark gap G6 is supplied with the voltage across the partial resistor R1b. The firing voltage for the auxiliary spark gap G3 may also in this case be 0.1 $u_2$, whereas the firing voltages for the spark gaps G4–G6 and the division of the zinc oxide resistor R1 are adapted such that, upon firing, a voltage of 0.15 $u_2$ lies across G6 and a voltage of 0.75 $u_2$ lies across G4 and G5.

This arrangement results in an amplification of the trigger effect and, in that way, a more reliable mode of operation.

Figure 5:
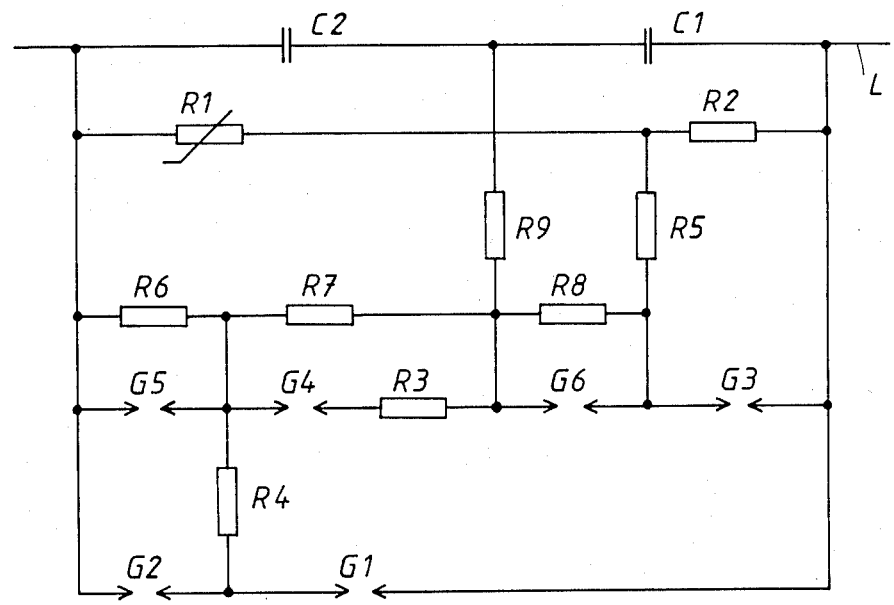

The embodiment according to FIG. 5 differs from that according to FIG. 4 in that, instead of taking out a trigger voltage from the resistor R1, the capacitor bank C is used as voltage divider. The capacitor bank is thereby divided into two partial banks C1 and C2, which are connected to the trigger circuit in such a way that the voltage across C1 is supplied to the series-connected spark gaps G3 and G6, whereas the voltage across C2 is supplied to the spark gaps G4 and G5. The division of the capacitor bank into C1 and C2 may, for example, be done so that the total capacitor voltage is divided between C1 and C2 with 0.2 $u_c$ on the former and 0.8 $u_c$ on the latter.

Figure 6:
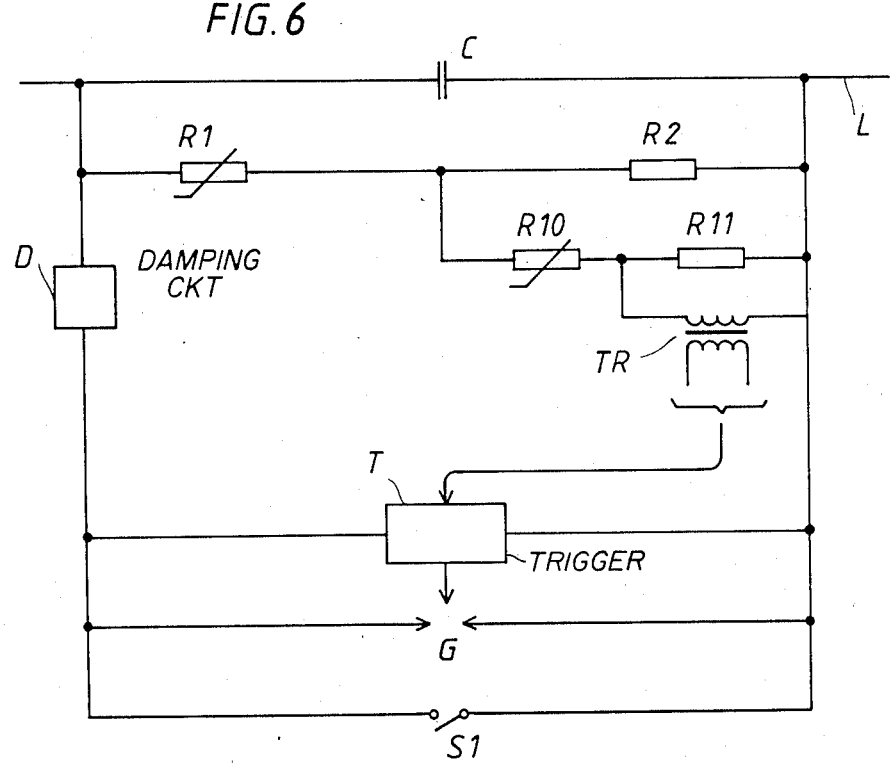
FIG. 6 shows a protective circuit in which the trigger device comprises a pulse transformer for stepping up pulses for triggering the spark gap.

FIG. 6 shows an embodiment in which the trigger circuit comprises a pulse transformer TR, the low-voltage winding (primary winding) of which is connected via a varistor R10 to the linear resistor R2. A linear resistor R11 is connected in parallel across the low-voltage winding of the transformer. The high-voltage winding of the transformer TR is connected to a trigger device T for firing the spark gap G. The trigger device may, for example, be built up, in principle, in the same way as that shown in FIG. 3. The above-mentioned damping circuit D and the by-pass circuit breaker S1 are also included in FIG. 6.

During normal operation, practically all the current in the line L passes through the capacitor bank C, and the resistor branch R1, R2 is currentless. When there is a short-circuit current in the line L, the current, during that part of the current half-wave when its instantaneous value exceeds a certain value, passes through the resistor branch R1, R2, whereby a voltage drop occurs across the resistor R2. As long as this voltage lies below a certain level, it is absorbed entirely by the varistor R10, and the voltage across the low-voltage level is exceeded, a rapid current increase through the varistor R10 and the resistor R11 takes place, the voltage across the lowvoltage winding of the transformer thus increasing almost instantaneously. With this design, a distinct firing of the spark gap G is obtained.

The invention is not restricted to the embodiments shown, but several modifications are possible. Thus, for example, the damping circuit D and the circuit breakers S1 and S2 may be included in any one of the circuits shown. Further, a protective means according to the invention may also be provided with an energy absorption detector which is arranged to sense energy absorption in the resistor R1 and, where necessary to prevent overload of the resistor, to deliver a signal for triggering the spark gaps. This detector may, for example, be designed as described in U.S. Pat. No. 4,432,029.

Instead of the linear resistor R2, it would also be possible to use a non-linear resistor having a considerably lower voltage-dependence than the metal oxide resistor R1, for example a silicon carbide resistor.

What is claimed is:

1. A protective circuit for a series capacitor in a high-voltage network, said circuit comprising:

a voltage-dependent resistor built up of metal oxide varistors and a linear resistor connected in series therewith, said series-connected voltage-dependent resistor and linear resistor being connected in parallel with a series capacitor;

at least one spark gap in parallel with said series-connected voltage-dependent resistor and linear resistor to shunt the latter with overload voltage thereof;

a trigger device to trigger said spark gap and responsive to the voltage generated across said linear resistor when said voltage exceeds a predetermined voltage; and said predetermined voltage being less than half the total voltage across said series capacitor.

2. A protective circuit according to claim 7, wherein said trigger device comprises a control circuit with a plurality of series-connected auxiliary spark gaps, and at least one of the auxiliary spark gaps is included in a parallel circuit connected to the linear resistor and has a firing voltage corresponding to said predetermined voltage.

3. A protective circuit according to claim 2, wherein the voltage-dependent resistor is connected in series with a circuit breaker which is closed during normal operation of the high-voltage network.

4. A protective circuit according to claim 2, wherein the voltage-dependent resistor functions as a voltage divider for the control circuit, and further comprising a cross-connection from a point between two of the auxiliary spark gaps to a point between two series-connected parts of the voltage-dependent resistor.

5. A protective circuit according to claim 4, wherein the voltage-dependent resistor is connected in series with a circuit breaker which is closed during normal operation of the high-voltage network.

6. A protective circuit according to claim 2, wherein the series capacitor is divided into two series-connected capacitors, and further comprising a cross-connection from a point between two of the auxiliary spark gaps to a point between said two series-connected capacitors.

7. A protective circuit according to claim 6, wherein the voltage-dependent resistor is connected in series with a circuit breaker which is closed during normal operation of the high-voltage network.

8. A protective circuit according to claim 1, wherein the trigger device comprises a pulse transformer, the low-voltage winding of which is connected via a varistor in parallel across said linear resistor.

9. A protective circuit according to claim 8, wherein the voltage-dependent resistor is connected in series with a circuit breaker which is closed during normal operation of the high-voltage network.

10. A protective circuit according to claim 1, wherein the voltage-dependent resistor is connected in series with a circuit breaker which is closed during normal operation of the high-voltage network.

* * * * *